United States Patent
Kenney et al.

(10) Patent No.: US 9,945,712 B2
(45) Date of Patent: *Apr. 17, 2018

(54) METHOD AND APPARATUS FOR DETECTION OF PHASE SEPARATION IN STORAGE TANKS

(71) Applicant: Franklin Fueling Systems, Inc., Madison, WI (US)

(72) Inventors: Donald P. Kenney, McFarland, WI (US); David R. Kruschke, Madison, WI (US)

(73) Assignee: Franklin Fueling Systems, LLC, Madison, WI (US)

( * ) Notice: Subject to any disclaimer, the term of this patent is extended or adjusted under 35 U.S.C. 154(b) by 641 days.

This patent is subject to a terminal disclaimer.

(21) Appl. No.: 14/475,087

(22) Filed: Sep. 2, 2014

(65) Prior Publication Data

US 2014/0366627 A1  Dec. 18, 2014

Related U.S. Application Data

(63) Continuation of application No. 12/580,493, filed on Oct. 16, 2009, now Pat. No. 8,878,682.

(51) Int. Cl.
*G08B 21/00* (2006.01)
*G01F 23/30* (2006.01)
*G01F 23/68* (2006.01)
*G01F 23/76* (2006.01)

(52) U.S. Cl.
CPC .............. *G01F 23/30* (2013.01); *G01F 23/68* (2013.01); *G01F 23/76* (2013.01); *Y10T 137/7287* (2015.04)

(58) Field of Classification Search
CPC ................................. G01F 23/76; G01F 23/68
USPC ................ 340/620–625; 73/290 R, 305–313
See application file for complete search history.

(56) References Cited

U.S. PATENT DOCUMENTS

| | | | |
|---|---|---|---|
| 1,340,293 | A | 5/1920 | Roach et al. |
| 2,458,759 | A | 1/1949 | Abell |
| 3,794,913 | A | 2/1974 | Cropper et al. |
| 3,862,571 | A | 1/1975 | Vogel |
| 3,935,741 | A | 2/1976 | Zinsmeyer et al. |

(Continued)

FOREIGN PATENT DOCUMENTS

| | | |
|---|---|---|
| EP | 0 949 487 | 10/1999 |
| EP | 1 992 920 | 11/2008 |

(Continued)

OTHER PUBLICATIONS

Office Action dated Sep. 18, 2015 in corresponding European Application No. 1013340.4.

(Continued)

*Primary Examiner* — Jeffery Hofsass
(74) *Attorney, Agent, or Firm* — Faegre Baker Daniels LLP

(57) ABSTRACT

A system and method for detecting phase separation in storage tanks is provided. At least one float has a density calibrated to detect a density differential among surrounding fluids. The float is buoyant on a relatively more dense lower layer of fluid such as phase separated fuel or pure water, while remaining submerged in a relatively less dense upper layer of fluid such as a gasoline/ethanol blend. A detection device sends a signal when the float rises or falls above or below a preset acceptable level.

22 Claims, 3 Drawing Sheets

(56) References Cited

U.S. PATENT DOCUMENTS

| | | |
|---|---|---|
| 3,946,625 A | 3/1976 | Miyazaki et al. |
| 3,964,037 A | 6/1976 | Lamphere |
| 4,031,864 A | 6/1977 | Crothers |
| 4,131,216 A | 12/1978 | Gerstenmaier |
| 4,155,254 A | 5/1979 | Colditz |
| 4,166,244 A | 8/1979 | Woods et al. |
| 4,176,553 A | 12/1979 | Wood |
| 4,178,623 A | 12/1979 | Emmerich et al. |
| 4,194,395 A | 3/1980 | Wood |
| 4,349,882 A | 9/1982 | Asmundsson et al. |
| 4,397,183 A | 8/1983 | Ballou et al. |
| 4,523,460 A | 6/1985 | Strikler |
| 4,594,892 A | 6/1986 | Admundsson |
| 4,600,844 A | 7/1986 | Atkins |
| 4,672,842 A | 6/1987 | Hasselmann |
| 4,679,433 A | 7/1987 | Clinton et al. |
| 4,706,203 A | 11/1987 | Ramsdale et al. |
| 4,720,997 A | 1/1988 | Doak et al. |
| 4,728,924 A | 3/1988 | Franklin |
| 4,789,946 A | 12/1988 | Sinz |
| 4,796,473 A * | 1/1989 | Custer .............. G01F 23/74 200/84 C |
| 4,885,529 A | 12/1989 | Lee et al. |
| 4,977,528 A | 12/1990 | Norris |
| 5,068,617 A | 11/1991 | Reich |
| 5,076,100 A | 12/1991 | Hunter et al. |
| 5,089,783 A | 2/1992 | Kapsokavathis et al. |
| 5,129,261 A | 7/1992 | Riley |
| 5,138,880 A | 8/1992 | Lee et al. |
| 5,142,909 A | 9/1992 | Baughman |
| 5,189,911 A | 3/1993 | Ray et al. |
| 5,253,522 A | 10/1993 | Nyce et al. |
| 5,319,545 A | 6/1994 | McGarvey et al. |
| 5,325,706 A | 7/1994 | Grose |
| 5,400,253 A | 3/1995 | O'Connor |
| 5,406,838 A | 4/1995 | Miller |
| 5,423,214 A | 6/1995 | Lee |
| 5,423,457 A | 6/1995 | Nicholas et al. |
| 5,471,873 A | 12/1995 | Nyce et al. |
| 5,602,333 A | 2/1997 | Larrabee et al. |
| 5,722,469 A | 3/1998 | Tuminaro |
| 5,734,851 A | 3/1998 | Leatherman et al. |
| 5,956,259 A | 9/1999 | Hatsell, Jr. et al. |
| 6,016,697 A | 1/2000 | McCulloch et al. |
| 6,052,629 A | 4/2000 | Leatherman et al. |
| 6,058,775 A | 5/2000 | Levy |
| 6,269,694 B2 | 8/2001 | Morimoto |
| 6,278,281 B1 | 8/2001 | Bauer et al. |
| 6,318,152 B1 | 11/2001 | Hagihara et al. |
| 6,433,560 B1 | 8/2002 | Hansen et al. |
| 6,481,277 B1 | 11/2002 | Wakamiya et al. |
| 6,519,539 B1 | 2/2003 | Freeman et al. |
| 6,578,416 B1 | 6/2003 | Vogel et al. |
| 6,624,755 B1 | 9/2003 | Chamberlin |
| 6,693,444 B2 | 2/2004 | Lin et al. |
| 6,782,736 B1 | 8/2004 | Hammer |
| 6,918,296 B1 | 7/2005 | Urquidi et al. |
| 6,938,478 B2 | 9/2005 | Arias |
| 6,978,661 B2 | 12/2005 | Hutchinson et al. |
| 7,278,311 B1 | 10/2007 | Demin |
| 7,346,427 B2 | 3/2008 | Hillam et al. |
| 7,360,418 B2 | 4/2008 | Pelovitz |
| 7,403,860 B2 | 7/2008 | Hart |
| 7,441,455 B2 | 10/2008 | Vargas Da Silva |
| 7,454,969 B2 | 11/2008 | Hart |
| 7,473,352 B2 | 1/2009 | Sundeng |
| 7,659,731 B2 | 2/2010 | Lin et al. |
| 7,987,878 B1 | 8/2011 | Imler |
| 2001/0020383 A1 | 9/2001 | Moos et al. |
| 2003/0057968 A1 | 3/2003 | Wang et al. |
| 2003/0185715 A1 | 10/2003 | Krivts et al. |
| 2004/0003660 A1 | 1/2004 | Fukuhara et al. |
| 2004/0020271 A1 | 2/2004 | Hutchinson |
| 2004/0093943 A1 | 5/2004 | Arias |
| 2006/0161374 A1 | 7/2006 | Hillam et al. |
| 2006/0169039 A1 | 8/2006 | Zalenski et al. |
| 2006/0181262 A1 | 8/2006 | Glenn et al. |
| 2006/0248952 A1 | 11/2006 | Jarvie |
| 2007/0119859 A1 | 5/2007 | Harrell |
| 2007/0180904 A1 | 8/2007 | Gao |
| 2007/0251316 A1 | 11/2007 | Mahadevaiah |
| 2008/0053202 A1 | 3/2008 | Rohklin et al. |
| 2008/0230146 A1 | 9/2008 | Kastner |
| 2009/0126481 A1 | 5/2009 | Burris |
| 2009/0173698 A1 | 7/2009 | Sundeng |
| 2009/0216464 A1 | 8/2009 | Kong et al. |
| 2009/0217753 A1 | 9/2009 | Burris |
| 2009/0265132 A1 | 10/2009 | Schrittenlacher et al. |
| 2010/0170338 A1 | 7/2010 | Prinstil et al. |
| 2010/0288019 A1 | 11/2010 | Simmons |
| 2010/0295565 A1 | 11/2010 | Drack |
| 2011/0048125 A1 | 3/2011 | Jackson et al. |
| 2011/0090088 A1 | 4/2011 | Kenney et al. |
| 2011/0185794 A1 | 8/2011 | Moss |
| 2011/0187529 A1 | 8/2011 | Maurer et al. |
| 2012/0152016 A1 | 6/2012 | Prinstil et al. |

FOREIGN PATENT DOCUMENTS

| | | |
|---|---|---|
| EP | 2 166 336 | 3/2010 |
| JP | 57-008434 | 1/1982 |
| JP | 2007-239510 | 9/2007 |
| JP | 2010-030623 | 2/2010 |
| JP | 2010-030623 | 12/2010 |
| WO | 96/41136 | 12/1996 |
| WO | 2008/064010 | 5/2008 |
| WO | 2009/089339 | 7/2009 |
| WO | 2010/013084 | 2/2010 |

OTHER PUBLICATIONS

EESIFLO, The EASZ-1 Transmitter Can Prove Water Removal Systems are Actually Working, http://www.eesiflo.com/water_in_oil_removal.html, available at least as early as Mar. 28, 2011, 4p.

ORB Instruments, Inc., Model W-800 UV Oil in Water Analyzer, http://www.orbinstruments.com/PDF/w800-uv-oil-in-water-jun06.pdf, Jun. 2006, 4p.

Hughes, Kevin, Treatise on Alcohol-Blended Gasoline: Phase Separation and Alcohol Monitors, http://www.cim-tek.com/pdfs.Treatise_on_phase_Separation.pdf, available at least as early as Apr. 5, 2011, 27p.

Karaosmanoglu, Filiz et al., Effects of a New Blending Agent on Ethanol-Gasoline Fuels, Energy & Fuels 1996, 10, American Chemical Society, Feb. 23, 1996, pp. 816-820.

Chinese Office Action and Search Report in CN201010513583.X, dated Nov. 26, 2013, 8 pages (translation).

Extended European Search Report and Written Opinion in EP10013340, dated Jan. 10, 2011, 7 pages.

Franklin Fueling Systems, "Tank Sentinel—Liquid Level Probes", TSP-LL2, Feb. 2004.

Office Action dated Apr. 12, 2013 in U.S. Appl. No. 13/191,194.

The PEI Journal Online, "Proper Handling of Ethanol", Third Quarter, 2007.

Muzikova. Ziata et al., "Water Tolerance of Petrol-Ethanol Blends", pp. 44-53, 2008.

EESIFLO, "EASZ-1 Online Water in Oil Monitor", 2002.

European Search Report dated Dec. 30, 2010 in corresponding EP Application No. 10013340.

DetectPhaseSeparation.com "http://www.detectphaseseparation.com/files/VR_PhaseTwoSalesBrochure.pdf", accessed Mar. 10, 2011.

PetroClear.com, "http://www.petroclear.com/technical-info/phase-separation-video-paper.html", 2010-2011.

Nationalpetroleum.net, "http://nationalpetroleum.net/Phase-Two-FAQ.pdf", Nov. 17, 2010.

Examination Report for European Patent Application No. 10013340.4, dated Mar. 4, 2016, 8 pages.

(56) References Cited

OTHER PUBLICATIONS

Examination Report for European Patent Application No. 100133404.4, dated May 9, 2017, 8 pages.
Office Action for Canadian Patent Application No. 2,715,296, dated Oct. 3, 2017, 5 pages.

* cited by examiner

METHOD AND APPARATUS FOR DETECTION OF PHASE SEPARATION IN STORAGE TANKS

CROSS REFERENCE TO RELATED APPLICATION

This application is a continuation of U.S. patent application Ser. No. 12/580,493, entitled METHOD AND APPARATUS FOR DETECTION OF PHASE SEPARATION IN STORAGE TANKS USING A FLOAT SENSOR and filed on Oct. 16, 2009, the entire disclosure of which is expressly incorporated herein by reference.

TECHNICAL FIELD

This invention relates to storage tank monitoring and, in particular, to a method and apparatus for detecting phase separation and/or the presence of foreign substances or contaminants in a storage tank.

BACKGROUND OF THE INVENTION

1. Field of the Invention

Liquid storage tanks are widely relied upon to preserve and protect their contents. In particular, fuel storage tanks are an important part of the wider energy distribution system, and are routinely called upon to preserve liquid fuels during periods of storage while maintaining the fitness of the stored fuel for dispensation and use on short notice. Fuel storage tanks are commonly used, for example, to store gasoline at a gasoline filling station for distribution to end users, i.e., vehicle operators. Gasoline storage tanks are exposed to a wide variety of environmental conditions, and are often stored underground. Unintentional ingress of environmental moisture is a condition that can be encountered by these tanks.

Gasoline storage tanks often contain a blend of gasoline and alcohol, with a blend having about 10% ethanol ("E-10") now commonly available as fuel for cars and trucks in the United States and abroad. Ethanol is a hygroscopic material, in that it attracts water from the air or from the surrounding environment. An excess amount of water in the E-10 gasoline/ethanol fuel blend, such as an amount of more than about 0.5% by volume, will result in a condition known as phase separation. When phase separation occurs, excess alcohol, water and some of the lighter parts of the gasoline form a new mixture that is heavier than the gasoline/ethanol blend but lighter than water. This new mixture separates from the E-10 fuel blend and falls to the bottom of the storage tank to form a bottom layer of fluid comprised of approximately 70% alcohol, 20% water and 10% gasoline. If water infiltrates the storage tank quickly, it may settle at the bottom of the tank, below any phase separated fluid, without combining with the ethanol.

Dispenser pumps in fuel storage tanks are typically located near the bottom of the tank. If the alcohol/water/gasoline mixture resulting from phase separation ("phase separated fluid") forms a thick enough layer at the bottom of the fuel storage tank, the mixture may be pumped into the tank of an end user, such as into an automobile gas tank. As a result, the automobile's engine may fail to start or may run poorly, and the phase separated fluid may have to be removed from the automobile's fuel system at substantial expense. If a layer of substantially pure water becomes thick enough to flow through the pump and into an automobile gas tank, significant damage to the automobile engine may result.

It would be desirable for a gasoline station operator to know whether phase separation and/or water ingress is occurring in the station's fuel storage tank, and particularly for the operator to know whether an alcohol/water/gasoline mixture resulting from the phase separation is at risk of being pumped to a customer.

SUMMARY OF THE INVENTION

In an exemplary embodiment of the present disclosure, a system and method for detecting phase separation in storage tanks is provided. At least one float has a density calibrated to detect a density differential among surrounding fluids. The float is buoyant on a relatively more dense lower layer of fluid such as phase separated fuel or pure water, while remaining submerged in a relatively less dense upper layer of fluid such as E-10 fuel. A detection device sends a signal when the float rises or falls above or below a preset acceptable level. A plurality of floats may be used for detection of multiple fluid densities.

In one embodiment, a fuel storage system includes a storage tank containing a gasoline/alcohol blend having a first fluid density and a phase separated fluid having a second fluid density that is greater than the first fluid density. The phase separated fluid includes a portion of the alcohol from the first fluid, mixed with water. The system includes a first sensing float having a first float density that is greater than the first fluid density and less than the second fluid density. The first sensing float has an output signal relating to the height of the sensing float relative to a datum. A controller is included, the controller having a comparator that compares the output signal to the datum. The controller determines the height of the first sensing float relative to the storage tank. The gasoline/alcohol blend may include gasoline and ethanol.

In another aspect, the storage tank contains a third fluid having a third fluid density that is greater than the second fluid density and greater than the first fluid density. The device further includes a second sensing float having a second float density that is less than the third fluid density and greater than the first and second fluid densities. The first float density is less than the third fluid density. The controller determines the height of the second sensing float relative to the storage tank. The third fluid may include water.

In another aspect, the first float density corresponds to a specific gravity of 0.80. The second float density may corresponds to a specific gravity of 0.95.

In yet another aspect, the storage tank may contain a plurality of fluids having a plurality of fluid densities, with the plurality of fluids arranged as adjacent layers within the storage tank. The fuel storage system may further include a plurality of sensing floats having a plurality of float densities, with each of the float densities being greater than one of the plurality of fluids and less than an adjacent layer of the plurality of fluids.

In still another aspect, the controller is programmed with an acceptable level of the phase separated fluid. The controller issues a notification for corrective action when the phase separated fluid rises above the acceptable fluid level. The storage tank may include a pump with a pump inlet, and the acceptable level may be lower than the pump inlet.

In another aspect, the system may include a controller programmed with an acceptable rate of change of a level of the phase separated fluid, with the controller issuing a notification for corrective action when the level of the phase separated fluid increases faster than the acceptable rate of change.

In another embodiment, a device for measuring the heights of interfaces between an upper fluid having an upper fluid density, a lower fluid having a lower fluid density, and an intermediate fluid having an intermediate fluid density includes a first sensing float having a first float density that is greater than the upper fluid density and less than the lower and intermediate fluid densities and a second sensing float having a second float density that is greater than the intermediate and upper fluid densities and less than the lower fluid density. A controlling means determines the heights of the first sensing float and the second sensing float relative to a datum. Thus, heights of the lower fluid and of the intermediate fluid are computed by the controlling means.

In one aspect, the controlling means are programmed with an acceptable lower fluid level, the controlling means issuing a notification for corrective action when the lower fluid rises above the acceptable lower fluid level. Where the device is located within a storage tank having a pump with a pump inlet, the acceptable lower fluid level may correspond with the height of the pump inlet.

In another aspect, the controlling means are programmed with an acceptable intermediate fluid level, and the controlling means issue a notification for corrective action when the intermediate fluid rises above the acceptable intermediate fluid level. Where the device is located within a storage tank having a pump with a pump inlet, the acceptable intermediate fluid level may correspond with the height of the pump inlet.

In yet another embodiment, a method of determining the level of multiple fluids in a tank includes providing a storage tank that contains a gasoline/alcohol blend having a first fluid density and a phase separated fluid having a second fluid density that is greater than the first fluid density. The phase separated fluid includes water mixed with alcohol from the first fluid. The method further includes providing a first sensing float having a first float density that is greater than the first fluid density and less than the second fluid density, and monitoring the height of the first sensing float relative to the storage tank.

In one aspect, method includes the steps, after the monitoring step, of comparing the height of the first sensing float against a first preset height and activating an alarm if the height of the first sensing float is greater than the first preset height.

In another aspect, the method includes the steps, after the monitoring step, of comparing the rate of change of the height of the first sensing float against a first preset rate of height change, and activating an alarm if the rate of change of the height of the first sensing float is greater than the first preset rate of change.

In another aspect, the storage tank contains a third fluid having a third fluid density that is greater than the second fluid density and greater than the first fluid density, and the first float density is greater than the third fluid density and less than the second fluid density. The method further includes the steps of providing a second sensing float having a second float density that is less than the third fluid density, greater than the second fluid density and greater than the first fluid density, and thereby monitoring the height of the second sensing float relative to the storage tank.

In yet another aspect, the method includes the steps, after the second monitoring step, of comparing the height of the second sensing float against a second preset height, and activating an alarm if the height of the second sensing float is greater than the second preset height.

In still another aspect, the method further includes the steps, after the monitoring step, of comparing the rate of change of the height of the second sensing float against a second preset rate of height change, and activating an alarm if the rate of change of the height of the second sensing float is greater than the second preset rate of change.

BRIEF DESCRIPTION OF THE DRAWINGS

The above mentioned and other features and advantages of the present invention, and the manner of attaining them, will become more apparent and the invention itself will be better understood by reference to the following description of an embodiment of the invention taken in conjunction with the accompanying drawings, wherein.

DETAILED DESCRIPTION OF A PREFERRED EMBODIMENT

Figure 1:
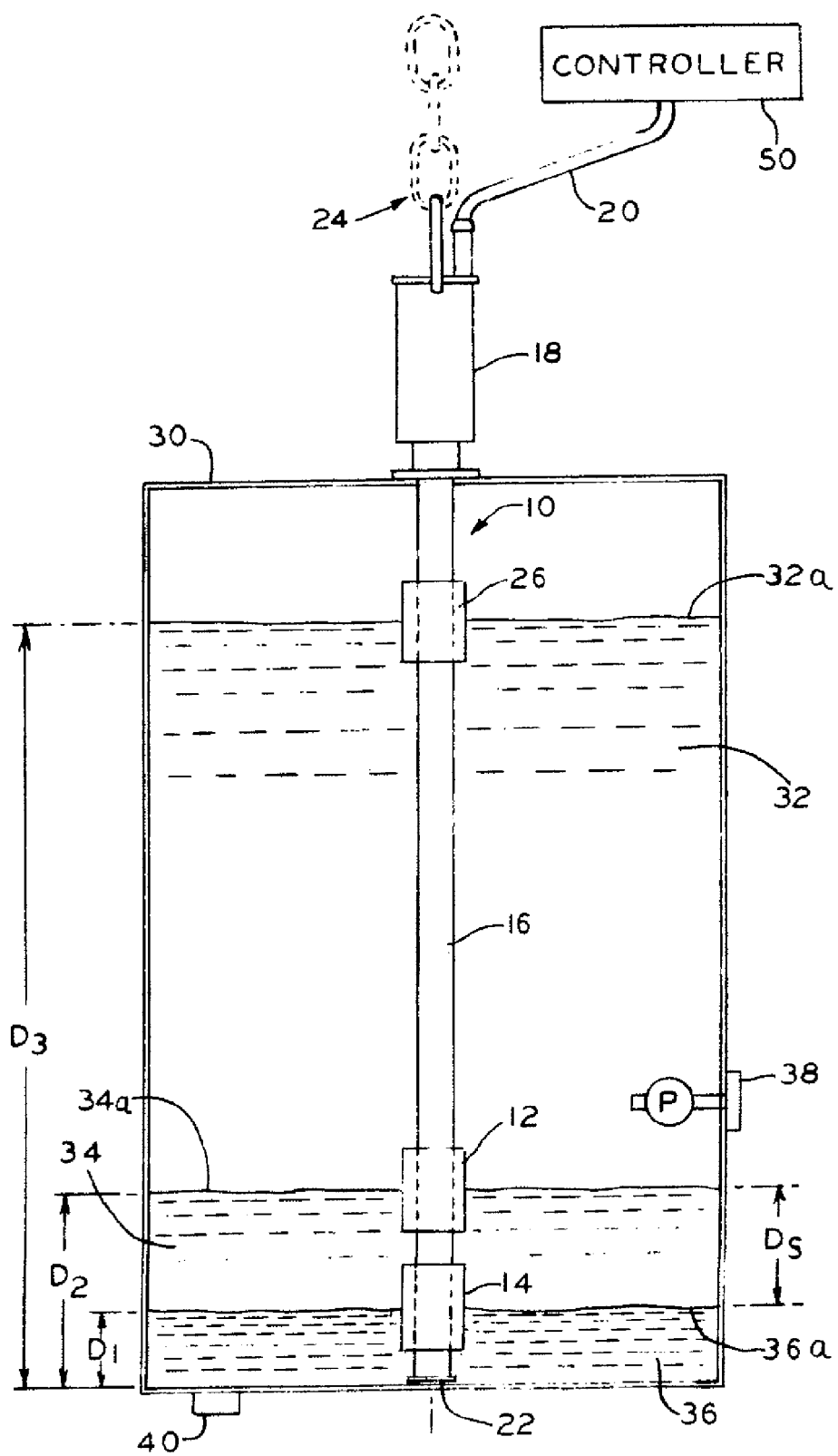
FIG. 1 is a side elevation view of a magnetostrictive probe in accordance with an embodiment of the present invention.
Figure 2:
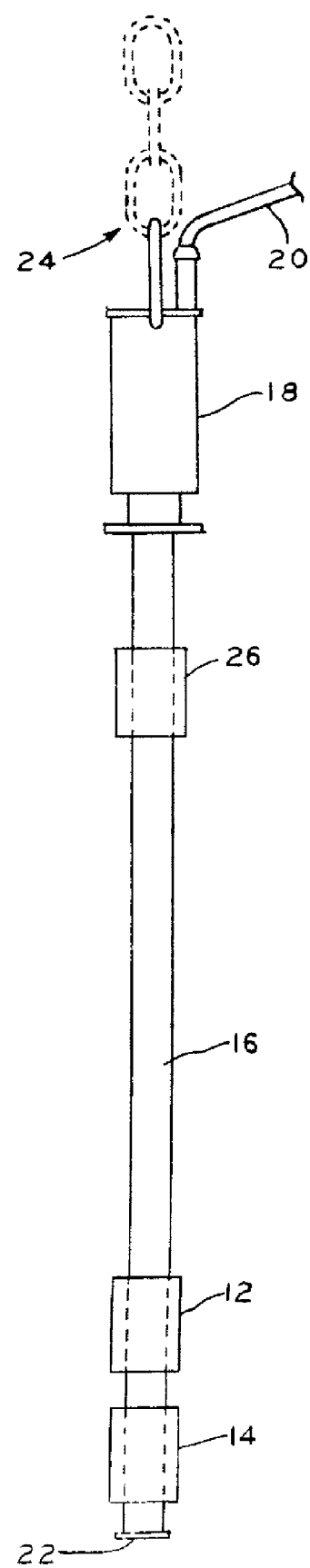
FIG. 2 is a sectional view of a storage tank including a phase separation detection probe in accordance with an embodiment of the present invention.

A phase separation detection device or probe, generally designated 10, is illustrated in FIGS. 1 and 2. Phase separation detection probe 10 includes upper float 12 with a relatively lower density and lower float 14 with a relatively higher density, each of which are slidably mounted on shaft 16. In an exemplary embodiment of the present invention, probe head 18 creates an electromagnetic field which forms around a wave guide within shaft 16 and interacts with the magnetic field of upper float 12 and/or lower float 14. This interaction produces a shock wave in shaft 16 which travels at a known speed to probe head 18 which, based on the time elapsed for the shock wave to travel at a known speed, outputs an electric signal through wire 20 corresponding to the relative position of upper float 12 and/or lower float 14 along shaft 16. Phase separation detection probe 10 may also include lower barrier or stopper 22 to prevent lower float 14 from sliding off of shaft 16. Phase separation detection probe 10 may optionally include attachment mechanism 24 which may be selectively releasable and provide for vertical adjustment of probe 10. It is within the scope of the present invention that the phase separation detection probe 10 may take other forms, such as a sonar based measurement system, a series of proximity switches, a laser measurement system, or the like. It is also within the scope of the present invention that the upper and lower floats may be arranged side-by-side or separated, as opposed to being directly above or below one another (i.e., coaxially arranged on a common shaft).

Referring now to FIG. 2, phase detection probe 10 is oriented generally vertically inside a storage tank 30. Storage tank 30 includes first or upper fluid 32 with upper level or surface 32a having a density $\rho_U$. Below upper fluid 32 is intermediate fluid 34 with upper level 34a. Intermediate fluid 34 has a density $\rho_M$ which is greater than density $\rho_U$. Below intermediate fluid 34 is lower fluid 36 with upper fluid surface 36a. Lower fluid 36 has a density $\rho_L$ which is greater than $\rho_M$ and greater than $\rho_U$. Upper float 12 is settled at a distance D2 above a bottom surface of storage tank 30, where D2 roughly corresponds with upper level 34a of fluid 34 relative to a datum, such as the bottom of storage tank 30. However, any datum could be used, such as another portion of storage tank 30, a portion of phase detection probe 10, and the like.

Upper float 12 settles at this distance because it has a density which is less than $\rho_M$ but greater than $\rho_U$. That is to say, upper float 12 will sink in a relatively less dense fluid, such as upper fluid 32, but will remain buoyant in a relatively more dense fluid, such as intermediate fluid 34. Similarly, lower float 14 settles at a distance D1 above the bottom surface of storage tank 30 because it has a density which is less than $\rho_L$ but greater than $\rho_M$. Probe 10, as shown in FIG. 2, optionally includes third float 26 with a density less than the density $\rho_U$ of upper fluid 32. Thus, upper float 26 settles at a distance D3 above the bottom of storage tank 30, where D3 roughly corresponds with upper surface 32a of fluid 32 (and the bottom of the ullage of tank 30).

In an exemplary embodiment of the present invention, storage tank 30 may be a fuel storage tank in which fluid 32 is a gasoline/ethanol blend, such as E-10 fuel, intermediate fluid layer 34 is a mixture primarily comprised of alcohol, water and a small amount of gasoline resulting from phase separation, and lower fluid 36 is substantially pure water. Thus, lower fluid 36 will have a specific gravity of 1.0. Intermediate fluid 34 will have a specific gravity of approximately 0.81 to 0.89, and more particularly above 0.82. Upper fluid 32 will have a specific gravity of approximately 0.68 to 0.78, and more particularly 0.73 to 0.75. In this exemplary embodiment, a first or upper float 12 has a density corresponding to a specific gravity of approximately 0.80, while a second or lower float 14 has a density corresponding to a specific gravity of approximately 0.95. Thus, upper float 12 will naturally settle at the junction between the gasoline/ethanol blend (i.e., upper fluid 32) and phase separated alcohol/water/gasoline (i.e., intermediate fluid 34), while lower float 14 will naturally settle at the junction between water (i.e., lower fluid 36) and the phase separated alcohol/water/gasoline (i.e., intermediate fluid 34). However, it is within the scope of the present invention that any number of fluids or materials of varying densities may be measured or detected.

Moreover, a fluid storage tank may contain a plurality of fluids, (such as a number of fluids represented by "n"), with each fluid having a different fluid density. The fluids will naturally settle in layers, similarly to fluids 32, 34, 36 as discussed above. Between each adjacent layer will be a fluid junction or interface, so that there are a total of n−1 fluid interfaces. A plurality of floats may be provided for measurement at each interface. For example, n−1 floats may be provided to measure the fluid level of each fluid interface in the fluid storage tank, with each float having a float density that is between the fluid densities of each pair of adjacent fluids. An additional float may also be provided with a density that is less than the density of the uppermost fluid, so that the additional float measures the interface between the uppermost fluid and the ullage of the tank.

In an exemplary embodiment, a float measuring the fluid level at the interface between any pair of fluids will have a float density that is closer to the fluid density of the pair's upper fluid as compared to the density of the pair's lower fluid. For example, a float density may be only slightly more than the density of the upper fluid in a pair of adjacent fluids. This "skewed density" prevents the float from over-traveling in the downward direction as the float settles to its intended location at the interface of a pair of fluids. It also ensures that the float will not "fall" quickly through the pair's upper fluid as it settles, but will instead "float" downwardly in a controlled manner through the upper fluid before reaching the fluid interface.

Figure 3:
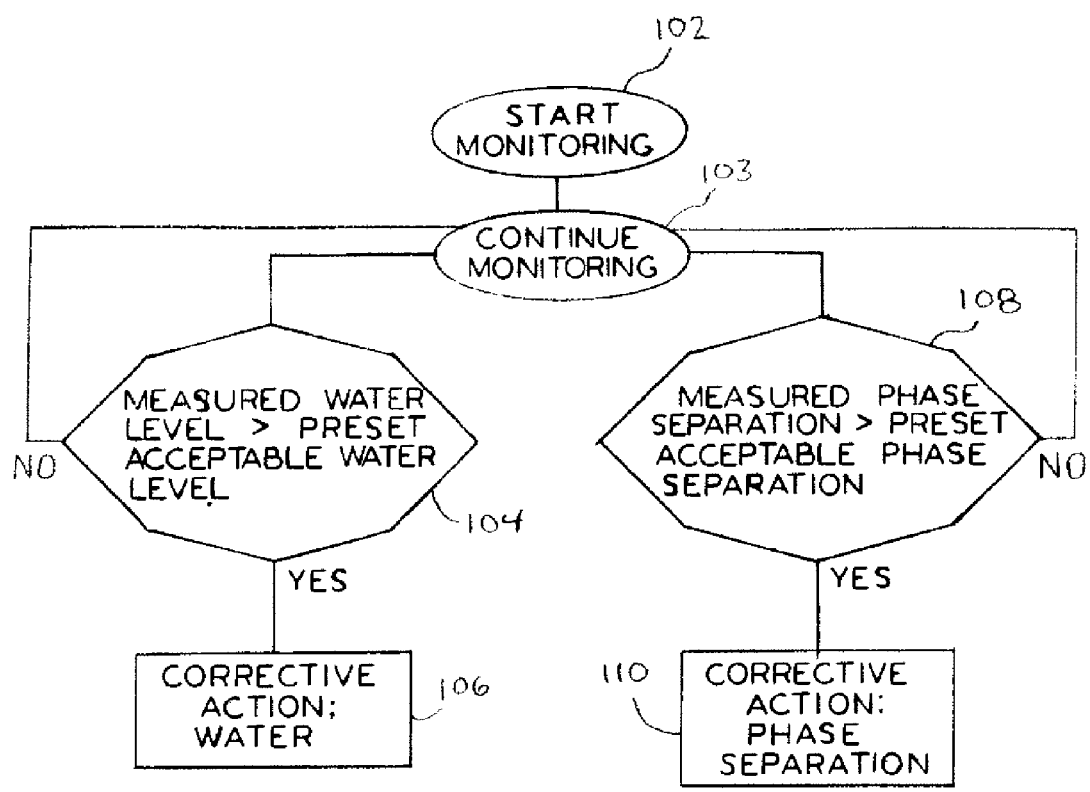
FIG. 3 represents a processing sequence of a controller in accordance with a phase separation detection system.

Fluid levels 32a, 34a, 36a are monitored by controller 50 via data feedback from probe head 18 indicative of positions of floats 26, 12, 14 respectively. Referring to FIG. 3, controller 50 (FIG. 2) continuously executes a software subroutine 100 to determine whether a measured level of water or phase separated fluid is within predefined acceptable limits. When the controller is instructed to start monitoring, as represented by block 102, controller 50 determines whether the level of lower fluid 36 (such as water) as measured by lower float 14 is above a preset acceptable water level, as represented by block 104, and discussed in more detail below. If the measured level is below the acceptable level, the controller will enter a feedback loop initiated and re-initiated by an instruction to continue monitoring, represented by block 103. If, however, the measured level is above the preset acceptable level, a notification for corrective action for the condition of excess lower fluid 36 (such as water) is issued, as represented by block 106. Similarly, controller 50 determines whether a measured level of phase separated fluid is greater than a preset acceptable level of phase separated fluid, represented by block 108. If the measured level of phase separated fluid is less than the preset acceptable level, controller 50 enters a feedback loop initiated and re-initiated by the instruction to continue monitoring, represented by block 103. If, however, the measured level is above the preset acceptable level, a notification for correction action appropriate to unacceptably high levels of phase separation is initiated, as represented by block 110.

Controller 50 may also calculate and/or monitor a distance $D_s$, as shown in FIG. 2, representing a distance between upper float 12 and lower float 14. More particularly, distance $D_s$ may be the distance between upper float 12 and lower float 14. Thus, distance $D_s$ is generally representative of the height or thickness of intermediate fluid layer 34. As $D_s$ approaches zero to within a nominal value, it may be inferred that intermediate fluid layer 34 is essentially non-existent (i.e., the volume of fluid layer 34 is zero). Conversely, if $D_s$ is greater than zero by more than the nominal value, then an intermediate fluid layer 34, such as a phase separated fluid layer can be assumed to exist. Moreover, a rate of change of $D_s$ may also be important to a user of probe 10. If $D_s$ has a positive rate of change, i.e., is growing, then an intermediate fluid layer 34, such as a phase separated layer, is experiencing growth and appropriate action can be taken. A preset acceptable rate of change may be programmed in to controller 50 in a similar fashion to the preset acceptable levels described above, so that a small, nominal or transient rate of change will not trigger a corrective action notification or other alarm.

With reference to controller 50, an exemplary controller in accordance with an embodiment of the present invention is the TS-5 Fuel Management System available from Franklin Fueling Systems Inc., located at 3760 Marsh Road, Madison, Wis. 53718 USA. However, it is within the scope of the present invention to use other controllers or microprocessors to perform the computing tasks described herein.

Preset acceptable volume levels (i.e., heights) for lower fluid 36 and intermediate fluid 34 will vary depending on the parameters of the system and the needs of the system user, and may be programmable into controller 50 by the user. In an exemplary embodiment of a fuel storage tank, as discussed above, acceptable levels may be related, for example, to the location of the inlet of an internal submersible pump (not shown) or, if a pump is located externally to storage tank 30, a tank outlet 38. If upper level 34a of intermediate fluid 34 reaches a pump inlet or tank outlet 38, a phase separated mixture of alcohol and water may be dispensed into a customer's gas tank, leading to poor engine performance and possibly the expense of removing the phase separated fluid from the vehicle's fuel system. Further, if the upper surface 36a of lower fluid 36 reaches a submersible pump inlet or tank outlet 38, water may be dispensed into a customer's fuel tank causing irreparable damage or other costly mishaps. Thus, a preset acceptable upper level for phase separated fluid in fuel storage tank 30 may be just below the level of a pump inlet or tank outlet 38, to prevent the need for frequent draining of the phase separated fluid (as discussed below). However, a preset acceptable level for water may be substantially below a pump inlet or tank outlet 38, owing to the greater risk for expense and damage.

When controller 50 recognizes that one or both fluids is at an unacceptably high level, notifications to take corrective action, represented by blocks 106, 110 of FIG. 3, may include an audible alarm, disengagement of a pumping system, complete shutdown of the fluid distribution system, automatic e-mail, fax or other message, or the like or any combination of these. Further, controller 50 may include programming to provide for a continuous display of the levels of floats 12, 14, 26 to provide information about the levels of various fluids in storage tank 30. For example, such display may be useful where storage tank 30 includes a drain valve 40 capable of draining lower fluid 36 from storage tank 30. A decision to drain fluid from drain valve 40, and how much fluid to drain therefrom, may be driven by knowledge of levels 36a, 34a, 32a and the attendant volumes of fluids 36, 34, 32, respectively.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A fuel storage system comprising:
   a storage tank containing a gasoline/alcohol blend having a first fluid density and a phase separated fluid having a second fluid density that is greater than the first fluid density, said phase separated fluid comprising water mixed with a portion of the alcohol from said gasoline/alcohol blend;
   a first sensing float configured to settle at a junction between the gasoline/alcohol blend and the phase separated fluid by having a first float density that is greater than the first fluid density and less than the second fluid density, said first sensing float having an output signal relating to the height of said sensing float relative to a datum; and
   a controller having a comparator, said comparator comparing said output signal to the datum, whereby said controller determines the height of said first sensing float relative to said storage tank, said controller issuing a notification for corrective action based on the height of said first sensing float.

2. The system of claim 1, wherein the gasoline/alcohol blend comprises gasoline and ethanol.

3. The system of claim 1, wherein:
   said storage tank contains a third fluid having a third fluid density that is greater than the second fluid density and greater than the first fluid density;
   said system further comprises a second sensing float having a second float density that is less than the third fluid density and greater than the second fluid density; and
   wherein said controller determines the height of said second sensing float relative to said storage tank.

4. The system of claim 3, wherein the third fluid comprises water.

5. The system of claim 2, wherein said first float density corresponds to a specific gravity of 0.80.

6. The system of claim 4, wherein said second float density corresponds to a specific gravity of 0.95.

7. The system of claim 1, wherein said storage tank contains a plurality of fluids having a plurality of fluid densities, said plurality of fluids arranged as adjacent layers within said storage tank, the fuel storage system further comprising a plurality of sensing floats having a plurality of float densities, each of said float densities being greater than one of said plurality of fluids and less than an adjacent layer of said plurality of fluids.

8. The system of claim 7, said plurality of floats each having a respective output signal, said comparator of said controller comparing each of the output signals to the datum, whereby said controller determines the heights of each of said plurality of sensing floats relative to said storage tank.

9. The system of claim 1, said controller programmed with an acceptable level of said phase separated fluid, and said controller issues the notification for corrective action when said phase separated fluid rises above the acceptable fluid level.

10. The system of claim 9, wherein said storage tank comprises a pump with a pump inlet, and the acceptable level is lower than said pump inlet.

11. The system of claim 1, further comprising a controller programmed with an acceptable rate of change of a level of said phase separated fluid, and said controller issues the notification for corrective action when the level of said phase separated fluid increases faster than the acceptable rate of change.

12. A device for measuring the heights of interfaces between an upper fluid having an upper fluid density, a lower fluid having a lower fluid density, and an intermediate fluid having an intermediate fluid density, the device comprising:
   a first sensing float having a first float density that is greater than the upper fluid density and less than the lower and intermediate fluid densities;
   a second sensing float having a second float density that is greater than the intermediate and upper fluid densities and less than the lower fluid density; and
   controlling means for determining the heights of said first sensing float and said second sensing float relative to a datum, whereby heights of said lower fluid and of said intermediate fluid are computed by said controlling means.

13. The device of claim 12, wherein said controlling means are programmed with an acceptable lower fluid level, and said controlling means issues a notification for corrective action when said lower fluid rises above the acceptable lower fluid level.

14. The device of claim 13, said device located within a storage tank having a pump with a pump inlet, and the acceptable lower fluid level corresponds with the height of said pump inlet.

15. The device of claim 12, wherein said controlling means are programmed with an acceptable intermediate fluid level, and said controlling means issues a notification for corrective action when said intermediate fluid rises above the acceptable intermediate fluid level.

16. The device of claim 15, said device located within a storage tank having a pump with a pump inlet, and the acceptable intermediate fluid level corresponds with the height of said pump inlet.

17. A method of determining the level of multiple fluids in a tank, the method comprising:
- providing a storage tank that contains a gasoline/alcohol blend having a first fluid density and a phase separated fluid having a second fluid density that is greater than the first fluid density, said phase separated fluid comprising water mixed with a portion of the alcohol from said gasoline/alcohol blend;
- providing a first sensing float configured to settle at a junction between the gasoline/alcohol blend and the phase separated fluid by having a first float density that is greater than the first fluid density and less than the second fluid density;
- monitoring the height of said first sensing float relative to said storage tank; and
- issuing a notification for corrective action based on the height of said first sensing float.

18. The method of claim 17 further comprising the steps, after the monitoring step, of:
- comparing the height of said first sensing float against a first preset height; and
- activating an alarm if the height of said first sensing float is greater than the first preset height.

19. The method of claim 17 further comprising the steps, after the monitoring step, of:
- comparing the rate of change of the height of said first sensing float against a first preset rate of height change; and
- activating an alarm if the rate of change of the height of said first sensing float is greater than the first preset rate of change.

20. The method of claim 17 wherein said storage tank contains a third fluid having a third fluid density that is greater than the second fluid density and greater than the first fluid density, the method further comprising the steps of:
- providing a second sensing float having a second float density that is less than the third fluid density and greater than the second fluid density; and
- monitoring the height of said second sensing float relative to said storage tank.

21. The method of claim 20 further comprising the steps, after the second monitoring step, of:
- comparing the height of said second sensing float against a second preset height; and
- activating an alarm if the height of said second sensing float is greater than the second preset height.

22. The method of claim 20 further comprising the steps, after the monitoring step, of:
- comparing the rate of change of the height of said second sensing float against a second preset rate of height change; and
- activating an alarm if the rate of change of the height of said second sensing float is greater than the second preset rate of change.

* * * * *